Figure 1:
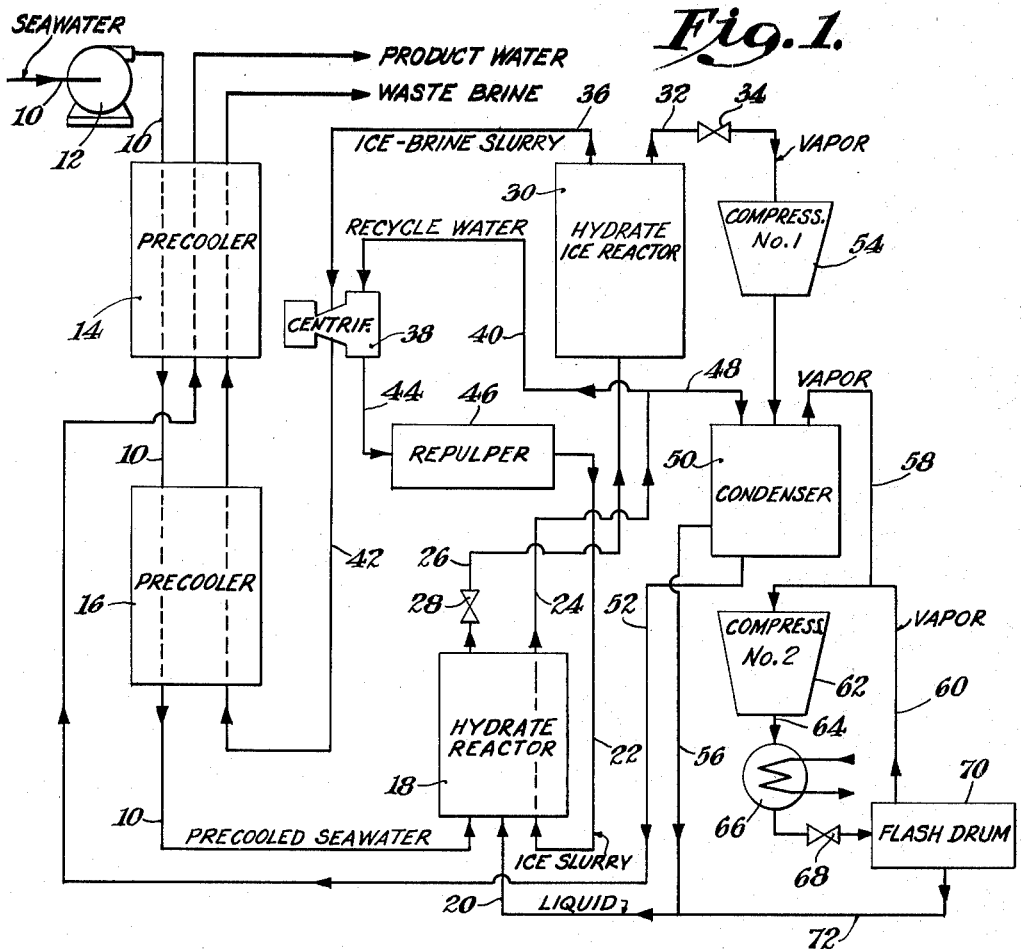

INVENTOR
Sidney B. Tuwiner
BY
AGENT

3,217,505
PROCESS OF PURIFYING AQUEOUS SOLUTIONS WITH HYDRATE FORMERS
Sidney B. Tuwiner, Baldwin, N.Y., assignor to The Lummus Company, New York, N.Y., a corporation of Delaware
Filed Aug. 11, 1961, Ser. No. 130,950
10 Claims. (Cl. 62—58)

This invention relates to a method for forming ice crystals in aqueous solutions and more particularly to the formation and separation of ice crystals from aqueous solutions for the purpose of extracting water from such aqueous solutions for concentrating such aqueous solution.

At present, the primary commercial method of demineralizing sea water consists of passing the sea water through multiple effect evaporators. Recently, many processes have been proposed, in addition to the use of distillation techniques, to demineralize sea water as the result of the growing shortage of fresh water and the generally uneconomical operation of evaporative techniques. Two of such processes are based on the use of freezing techniques of hydrate techniques.

My invention is based upon the utilization of both techniques in a single process whereby I am able to demineralize sea water at substantially less power requirements than similar processes which have heretofore been proposed. While I will presently describe my invention in terms of the demineralization of sea water so as to obtain potable water, it will be appreciated that the process is also applicable to the concentration of other types of aqueous solutions, such as fruit juices, waste liquors from delignification of cellulosic materials, as well as in the recovery of calcium hypochlorite from the reaction of chlorine monoxide with lime.

The freezing processes which have been proposed for the demineralization of sea water may be basically categorized into two groups. One utilizes a water-insoluble refrigerant which is brought into direct contact with the sea water and is vaporized thereby causing ice crystals to form. The ice crystals are separated from the enriched brine, washed with demineralized water and melted to form product water. The other type of freezing process is the one where through indirect heat exchange, ice crystals are formed, separated and melted to form demineralized water. The advantages of utilizing freezing processes over the evaporative processes are many, such as low heat transfer and energy requirements, absences of scale forming problems and the like.

Processes akin to the freezing processes utilize hydrate systems, and generally speaking, have the additional advantage over the freezing processes in that substantially higher temperatures may be used as compared to the freezing point of water in sea water. A solid hydrate is a substance which is formed when two or more compounds are associated without ordinary union through partial or complete enclosure of one compound by another.

As discussed in U.S. Patent No. 2,974,102, a hydrate forming gas, such as ethane, is added to saline water under appropriate conditions of temperature and pressure whereby the solid hydrate is formed. The solid hydrate is separated from the enriched saline water, and is passed to a zone of reduced pressure wherein the hydrate decomposes to form the hydrate forming gas and pure water. A portion of the product water is recycled to the solid hydrate separation step to remove enriched saline water from the solid hydrate. One of the disadvantages of the hydrate method is the small crystal size of the hydrate and the difficulty of separating the hydrate from the enriched brine.

It is a principal object of my invention to provide a process for extracting water from aqueous solutions or for concentrating aqueous solutions by using in a series of processing steps both freezing and hydrate techniques.

A further object of my invention is to provide a process for extracting water from aqueous solutions or for concentrating aqueous solutions by using in a series of processing steps both freezing and hydrate techniques whereby the separation of solids from the enriched solution may be more easily accomplished.

Yet another object of my invention is to provide a process for extracting water from aqueous solutions or for concentrating aqueous solutions by using in a series of processing steps both freezing and hydrate techniques wherein the ice crystals are of such size as to facilitate separation thereof from the enriched aqueous solution and to minimize occlusion of solute in the ice crystals.

Still another object of my invention is to provide a process for extracting water from aqueous solutions or for concentrating aqueous solutions wherein the latent heat of phase transformation provides the energy requirements for the system.

A still further object of my invention is to provide a process for extracting water from aqueous solutions or for concentrating aqueous solutions at substantially reduced power requirements than have heretofore been obtained.

Still another object of my invention is to provide a process for extracting water from aqueous solutions or for concentrating aqueous solutions by using in a series of processing steps both freezing and hydrate techniques wherein there is a reduction in refrigeration requirements both in terms of the amount of refrigerant used, and the size of compressors.

Yet a further object of my invention is to provide a process for extracting water from aqueous solutions or for concentrating aqueous solutions which most closely follows a cycle of operation which is thermodynamically reversible.

Another object of my invention is to provide a process for extracting water from aqueous solutions or for concentrating aqueous solutions utilizing hydrate and freezing techniques whereby a minimum amount of work is required for compression.

Other objects and a fuller understanding of the invention may be had by referring to the following description taken in conjunction with the drawing which is a schematic flow diagram illustrating a preferred embodiment of my invention for extracting water from aqueous solutions or for concentrating aqueous solutions.

As hereinbefore mentioned, my invention utilizes both freezing and hydrate methods. Generally, in accordance with my invention (as described with reference to the demineralization of saline water), precooled saline water is contacted with a hydrate forming substance which forms a hydrate at a temperature above the melting point of ice in water. During the contact a minor portion of the hydrate forming substance may be vaporized and provides a portion of the cooling requirements necessary to form the hydrate, but the remaining portion of the cooling requirements being provided by indirect heat exchange. The hydrate and enriched brine is thereafter passed to another zone wherein the temperature of the hydrate-enriched brine mixture is reduced to the fusion temperature of water in brine whereby ice crystals are formed. The ice crystals and enriched brine are withdrawn from the zone and are passed to a separator wherein the ice crystals are separated from the enriched brine and are washed with pure water. The ice crystals in slurry form are passed to the hydrate forming step and are melted by indirect heat exchange relation to provide a portion of the cooling requirements for such step. Thus, an important feature of my invention is the thermodynamic cycle wherein the hydrate is decomposed while simultaneously forming ice crystals and using the ice crystals after separation from the enriched brine to abstract the heat given off by the hydrate forming reaction.

All freezing processes which have been proposed to date, require that the refrigerant absorb the latent heat of ice crystal formation. According to my invention, a minor portion of the latent heat of absorption is by refrigerant evaporation.

Many hydrate forming substances have been investigated. An ideal hydrate is one which has a high rate of formation, with a minimum of undercooling. Other factors relate to equilibrium pressure, solubility in water and cost. While most hydrates have a formation temperature above the melting point of ice for a specific aqueous solution, and while many hydrates will be operative in accordance with my invention, preferably, I utilize a hydrate forming substance which has a hydrate forming temperature slightly higher than the freezing point of water. This critical temperature is the temperature at which the hydrate, aqueous, solution, hydrate forming liquid and vapor are all in equilibrium. For a two component system, temperature and pressure are invariant at this point. Addition of another component, such as salt, causes a shift in the invariant point. Generally, the addition of a solute lowers the temperature of the formation of the hydrate approximately the same amount as the solute would lower the freezing point of water for any concentration of solute. This result follows from the fact that the latent heat of formation of the hydrate from the liquid hydrate forming substance and water is almost the same as the latent heat of fusion for an equivalent amount of water to ice.

The primary objective in selecting a hydrate system for use in my invention is to select a system which achieves a condition whereby the transformation of hydrate to ice crystals may be accomplished adiabatically with a minimum quantity of hydrate vapor required to be compressed and condensed. It is also desirable to select a hydrate forming substance which forms a hydrate in a brine solution at a temperature about 5° F. above the normal melting point of ice so that the latent heats may be exchanged under reasonable, but not excessive, temperature driving forces. Propane, as a hydrate forming substance meets the above requirements almost perfectly for sea water.

Further, in accordance with my invention, I am able to achieve greater reduction in energy requirements by using the latent heat absorption capacity of the ice to withdraw heat of hydration released on reaction of the aqueous solution with the hydrate forming substance.

Thus, in a preferred embodiment of my invention, the hydrate forming temperature must be above the melting point of ice if the latent heat of melting is to be used to absorb the latent heat of hydrate formation. The ideal hydrate forming substance would be one for which the critical temperature for hydrate decomposition in water would exceed 32° F. by at least an amount for which the transformation temperature is depressed by the dissolved solute. In practice, however, as hereinbefore mentioned, I use a hydrate forming substance which has a somewhat higher critical temperature than an ideal system so as to provide a reasonable thermal driving force. In the other hand, it is not desirable to select a hydrate system which exceeds by very much the minimum herein set forth.

An object of my invention is to provide a process whereby a minimum amount of work of compression is required. This work would be represented by the following equation prior to allowance for mechanical inefficiency and for refrigerating the sea water to the hydrate temperature:

$$W = H(1 - (492 - T)/T_c)$$

where
H is the heat of hydration per pound of water,
T is the temperature depression as a result of solute in ° R, and
$T_c$ is the critical temperature in pure water in ° R.

From this equation, it may be seen that the hydrate critical temperature ($T_c$) should not be much greater than the minimum for the least expenditure of energy W.

Figure 2:
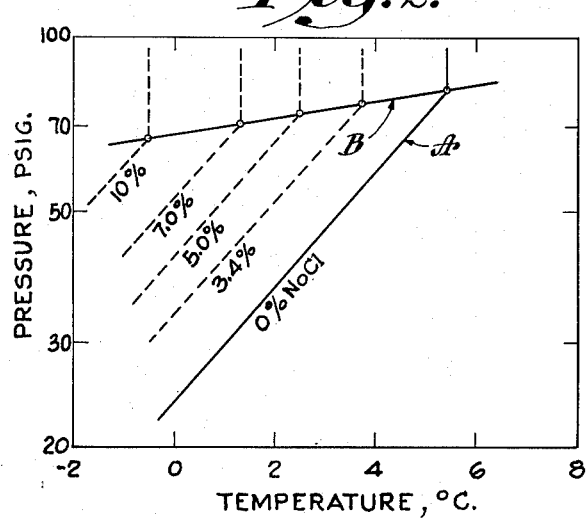

The invention will now be further described by reference to the accompanying drawing in which, FIGURE 1 illustrates a flow diagram setting forth the processing steps for demineralizing saline water in accordance with my invention; and FIGURE 2 is a phase diagram for propane hydrate system.

Referring to FIGURE 1, sea water in line 10 is passed by pump 12 through precoolers 14 and 16 into hydrate reactor 18. The sea water may be deaerated, if desired, in a deaerator (not shown) prior to passage through the precoolers. Deaeration reduces the effect of inert gases on the condensing rate on the hydrate and also, reduces corrosion in the hydrate reactor. The sea water is cooled in precoolers 14 and 16 by indirect heat exchange with product and waste brine streams, as more fully hereinafter described, to a temperature slightly above the hydrate forming temperature for the hydrate system. Alternately the sea water may be cooled by direct heat exchange against an intermediate fluid of limited solubility. Liquid hydrate forming substance is introduced through line 20 into reactor 18 wherein a portion of the liquid hydrate forming substance is vaporized to provide a portion of the cooling effect necessary to effect the formation of the hydrate from the liquid hydrate forming substance and to maintain reactor 18 at the temperature of hydrate formation. The remaining portion of the cooling effect is provided by the ice slurry passing through reactor 18 in indirect heat exchange relation with the hydrate system and withdrawn through line 24. The formation of the hydrate in reactor 18, reduces the water content of the sea water thereby forming concentrated sea water (brine). It is contemplated that with certain other hydrate systems, that the hydrate forming substance may be introduced into the reactor 18 in the gaseous phase with the necessary cooling requirements to maintain the temperature therein at the hydrate forming temperature being provided by other means.

The hydrate-brine mixture is withdrawn from reactor 18 through line 26 under the control of valve 28 and is passed to hydrate-ice reactor 30. In reactor 30, the pressure on the mixture is reduced to a pressure at which the equilibrium temperature of the hydrate is reduced to the temperature of ice formation. The latent heat required to decompose the hydrate reduces the temperature of the hydrate-brine mixture to the freezing point of water in sea water, thus causing ice crystals to form. Decomposition of the hydrate causes the hydrate forming substances to pass into the gas phase. In the ice-hydrate reactor 30, decomposition of the hydrate may be effected by reducing the temperature of the hydrate-brine mixture introduced into reactor 30 by passing a refrigerant in indirect heat exchange relation to the hydrate-brine mixture. Such cooling may be effected either in the reactor 30 or prior to introduction of the hydrate-brine mixture into the reactor. Preferably, as hereinbefore mentioned, the pressure is reduced so as to achieve most closely an adiabatic transformation. It is also contemplated that the pressure reduction in reactor 30 may be accomplished in stages so as to achieve shorter residence time. Causing the phase transformation of hydrate to ice to proceed more slowly assures better control over ice crystal growth.

The size of the ice crystals formed in reactor 30 is controlled by the rate of withdrawal of the gaseous hydrate forming substance from the reactor through line 32 under the control of valve 34.

The ice crystals and enriched brine are withdrawn from reactor 30 through line 36 and are passed to centrifuge 38. In centrifuge 38, the ice crystals are separated from the enriched brine and are washed with a small portion of demineralized water introduced thereto through line 40. The enriched brine is withdrawn from centrifuge 38 through line 42 and is passed through precoolers 16 and 14 to provide a portion of the requirements for cooling the incoming sea water prior to being discharged. As hereinbefore mentioned, the ice crystals are of substantially larger size than hydrate crystals thereby facilitating the separation step, and results from the control over undercooling exercised in the adiabatic transformation.

The ice crystals in slurry form are withdrawn from centrifuge 38 through line 44 and are passed to repulper 46 wherein the magma density of the ice crystals is controlled. The ice slurry leaving repulper 46 through line 22 is passed through reactor 18 in indirect heat exchange relation and provides a major portion of the cooling effect required to form the hydrate by the latent heat of melting of the ice crystals.

Substantially all of the ice is melted in reactor 18 and forms product demineralized water. A minor portion of the demineralized water in line 24 is passed via line 40 to centrifuge 38 to provide the fresh water required to wash the enriched brine from the ice crystals during separation of the latter from the former. The major portion of the demineralized water in line 24 forming the product stream of my invention, as it pertains to the extraction of water from aqueous solutions, is passed through line 48 to condenser 50. The product water is introduced into condenser 50 and is directly contacted with compressed vapors and is withdrawn from condenser 50 through line 52, and is thereafter passed through precooler 14 and withdrawn as product.

The gaseous hydrate forming substance in line 32 is passed to compressor 54 and thence into condenser 50 wherein a portion of the compressed gaseous hydrate forming substances may be condensed to the liquid phase by direct contact with the product water introduced into condenser 50 through line 48. The liquid hydrate forming substance is withdrawn from condenser 50 through line 56 and provides a portion of the liquid hydrate forming substance introduced into reactor 18 through line 20.

The uncondensed hydrate forming substance leaving the condenser 50 is passed through line 58 and together with an additional stream of gaseous hydrate forming substance in line 60 to secondary compressor 62. The compressed gaseous hydrate forming substance is withdrawn from secondary compresor 62 through line 64 and is passed through condenser 66 under the control of valve 68 into flash drum 70. The compressed hydrate forming substance in line 64 is condensed, after passing through condenser 66 and is introduced into flash drum 70. In flash drum 70, a minor portion of the condensed hydrate forming substance is vaporized to reduce the temperature of the liquid hydrate forming substance. The liquid hydrate forming substance withdrawn from flash drum 70 through line 72 forms the remaining portion of the liquid hydrate froming substance in line 20 introduced into reactor 18.

*Example I*

A preferred embodiment of my process for demineralizing sea water is illustrated by reference to the following example of operating data read in conjunction with the accompanying drawing. 25,875 pounds per hour of sea water having a salt content of about 3.38 weight percent and at a temperature of about 85° F. is passed through precoolers 14 and 16 wherein it is cooled to a temperature of about 32° F. The precooled sea water is then introduced into hydrate reactor 18 and is contacted with 1,130 pounds per hour of liquid propane at a temperature of 40° F. The hydrate reactor is maintained at a temperature of about 35° F. and at a pressure of about 72 p.s.i.a. and forms 9,462 pounds per hour of propane hydrate which is suspended in the enriched brine. The propane hydrate is formed in successive stages of the reactor 18 thereby causing the sea water to become more and more concentrated with respect to salt and the suspended hydrate. It is important, however, to insure that the hydrate is fluid throughout the reactor.

The enriched sea water-propane hydrate slurry at a temperature pressure of about 35° F. and 72 p.s.i.a., respectively, is withdrawn from the hydrate reactor 18 and is passed to the hydrate-ice reactor 30. In this reactor, the slurry is caused to undergo a stagewise reduction in pressure and temperature without heat exchange means. This change is first brought about rapidly as the heat of decomposition of the hydrate is absorbed in reducing the temperature of the slurry to 26° F., while the pressure is being reduced to 20 p.s.i.a. Once the temperature reaches 26° F., ice crystals begin to appear and the temperature and pressure remain constant until the hydrate is completely decomposed thus leaving an ice-brine magma.

The magma is withdrawn and passed to a low G centrifuge 38. The ice crystals are washed with about 5% of its weight with cold water which is discharged together with the enriched brine. The ice crystals are withdrawn from the centrifuge 38 and are conveyed with a stream of cold water to repulper 46 wherein the magma density is controlled. The ice slurry is introduced into the hydrate reactor 18 in indirect heat exchange relation to the incoming feed streams wherein the latent heat of melting of the ice provides a major portion of the cooling effect required to form the hydrate therein. The ice slurry is withdrawn from reactor 18 through line 24 with 5% thereof providing the wash water in centrifuge 38. The remaining portion forms the product stream of 8330 pounds per hour of demineralized sea water.

Propane vapor leaving the hydrate ice reactor 30 at a temperature of 26° F. is compressed to 75 p.s.i.a. and is directly contacted in condenser 50 with the product water which is at a temperature of 32° F. to condense a portion of the propane vapor. The uncondensed propane vapor withdrawn from condenser 50 is further compressed to 85 p.s.i.a. and thereafter condensed for recycle, together with the first condensed portion of propane, to the hydrate reactor 18. The product water is raised to a temperature of about 53° F. during condensation of the first portion of propane vapors leaving the first compressor stage. The product water is then passed through precooler 14 to provide a portion of the cooling requirements therein and is eventually discharged as product at a temperature of about 83° F. The enriched brine leaving centrifuge 38 in line 42 is passed through precoolers 16 and 14 and is heated and discharged as waste brine at a temperature of 83° F.

The ideal energy input is 15.76 H.P.H. per 1000 gallons of product. Actually, the total work is 21.1 kwh. per gallon of product water as a result of compressor inefficiency and power requirements for pumps, centrifuges and the like.

*Example II*

As hereinbefore mentioned, my invention may also be utilized in concentrating aqueous solutions such as fruit juices, waste sulfite liquors and the like. Of course, a hydrate forming substance must be chosen which will not import a foreign taste to the orange juice when reconstituted nor harmful to the user should a minor portion thereof remain in the concentrated juice. While the basic concept of my invention is employed to make large ice crystals, the processing steps are performed batchwise with the functions of the reactor vessels 18 and 30 being performed in a single jacketed vessel. To illustrate this embodiment of my invention, 1000 gallons of 12° Brix fresh orange juice was added to 500 gallons of previously concentrated 42° Brix orange juice. The vessel is provided with twin opposed Centricone agitators mounted on a cover plate having a vapor tight seal against the side walls of the reactor and a vapor tight gland for the propeller shaft.

Cooling water at a temperature of 32° F. is circulated through the jacket of the vessel while continuously agitating the orange juice. 1743 pounds of Freon 21 is gradually introduced over a period of an hour at a rate whereby the pressure in the vessel does not exceed 14.7 p.s.i.a. At the completion of the hydrate reaction, the pressure in the vessel falls below 9 p.s.i.a. At this point, the circulating cooling water is stopped, the pressure in the vessel is reduced by applying a suction of 70 mm. absolute. Gaseous Freon 21 is withdrawn at a rate of 100 pounds per hour. During vapor withdrawal, the hydrate of Freon 21 decomposes producing ice crystals and Freon 21 vapor which is compressed at 15.33 p.s.i.a. and condensed for recycle.

The magma of ice crystals in the juice concentrate is then passed to a 36 inch basket centrifuge wherein the crystals are separated from 750 gallons of 42° Brix juice, 500 of which is recycled thereby providing for 250 gallons of net product. The ice crystals withdrawn from the centrifuge are added to ice water and the ice slurry is circulated through the jacket vessel during the hydrate formation step. Approximately 750 gallons of ice water is discharged per batch of treated orange juice.

While I have shown and described preferred forms of my invention, I am aware that variations may be made thereto and I therefore desire a broad interpretation of my invention within the scope of the disclosure herein and the following claims:

I claim:

1. A method for forming ice crystals in an aqueous solution having a solid hydrate suspended therein comprising effecting the decomposition of said hydrate in said aqueous solution at the fusion temperature of water in said aqueous solution while simultaneously forming said ice crystals.

2. A method of forming ice crystals in an aqueous solution comprising contacting said aqueous solution with a hydrate forming substance, forming a hydrate from said hydrate forming substance and the water in said aqueous solution, reducing the temperature of the mixture of said hydrate and now enriched aqueous solution to the fusion temperature of water in said enriched aqueous solution, and effecting the decomposition of said hydrate while simultaneously forming ice crystals in said enriched aqueous solution.

3. A method of forming ice crystals in an aqueous solution comprising contacting said aqueous solution with a hydrate forming substance, forming a hydrate from said hydrate forming substance and the water in said aqueous solution, reducing the temperature of the mixture of said hydrate and now enriched aqueous solution to the fusion temperature of water in said enriched aqueous solution, effecting the decomposition of said hydrate to form said hydrate forming substance in gas phase while simultaneously forming ice crystals in said enriched aqueous solution, and controlling the rate of withdrawal of said gaseous hydrate forming substance during hydrate decomposition to control the size of said ice crystals.

4. A process for extracting potable water from an aqueous solution which comprises contacting said aqueous solution with a hydrate forming substance, forming a hydrate from said hydrate forming substance and the water in said aqueous solution, reducing the temperature of the mixture of said hydrate and now concentrated aqueous solution to the fusion temperature of water in said concentrated aqueous solution, decomposing said hydrate while simultaneously forming ice crystals in said concentrated aqueous solution, separating said ice crystals from said concentrated aqueous solution, and melting said ice crystals to form potable water.

5. A process for extracting potable water from an aqueous solution which comprises contacting said aqueous solution with a hydrate forming substance, forming a hydrate from said hydrate forming substance and the water in said aqueous solution, reducing the temperature of the mixture of said hydrate and now concentrated aqueous solution to the fusion temperature of water in said concentrated aqueous solution, decomposing said hydrate to the hydrate forming substance in gas phase while simultaneously forming ice crystals in said concentrated aqueous solution, controlling the rate of withdrawal of said gaseous hydrate forming substance during hydrate decomposition to control the size of said ice crystals, separating said ice crystals from said concentrated aqueous solution, and melting said ice crystals to form potable water.

6. A process for concentrating an aqueous solution which comprises contacting said aqueous solution with a hydrate forming substance, forming a hydrate from said hydrate forming substance and the water in said aqueous solution, reducing the temperature of the mixture of said hydrate and now concentrated aqueous solution to the fusion temperature of water in said concentrated aqueous solution, decomposing said hydrate while simultaneously forming ice crystals in said concentrated aqueous solution, and separating said ice crystals from said concentrated aqueous solution while simultaneously washing said ice crystals with water, melting said ice crystals and using a portion of the water formed by melting said ice crystals to wash said ice crystals during said separation step.

7. A process for extracting water from an aqueous solution which comprises contacting said aqueous solution with a hydrate forming substance, forming a hydrate from said hydrate forming substance and the water in said aqueous solution while removing the latent heat of formation of said hydrate, reducing the pressure on the mixture of said hydrate thereby to lower the temperature of said mixture to the fusion temperature of water in said aqueous solution by the latent heat of decomposition of said hydrate, simultaneously forming ice crystals while effecting the decomposition of said hydrate to water and hydrate forming substance in the gas phase, controlling the rate of withdrawal of said gaseous hydrate forming substance during hydrate decomposition to control the size of said ice crystals, separating said ice crystals from said aqueous solution, and passing said ice crystals in slurry form in indirect heat exchange relation to said first contact of said hydrate forming substance and aqueous solution whereby latent heat of formation of said hydrate is absorbed by melting said ice crystals.

8. A method of forming ice crystals in sea water comprising contacting said sea water with a hydrate forming substance having a hydrate formation temperature of about 5° F. higher than the normal melting point of ice, forming a hydrate from said hydrate forming substance and the water in said sea weater, reducing the temperature of the mixture of said hydrate and now enriched brine to the fusion temperature of water in said brine and effecting the decomposition of said hydrate while simultaneously forming ice crystals in said brine.

9. A process for extracting potable water from an aqueous solution which comprises contacting said aqueous solution with a liquid propane at temperature and pressure at which the propane hydrate forms, forming a propane hydrate, reducing the temperature of the mixture of said propane hydrate and now concentrated aqueous solution to the fusion temperature of water in said concentrated aqueous solution, decomposing said hydrate while simultaneously forming ice crystals in said concentrated aqueous solution, separating said ice crystals from said aqueous solution, and melting said ice crystals to form potable water.

10. A process for concentrating a fruit juice which comprises contacting said fruit juice with a liquid hydrate forming substance, forming a hydrate from said liquid hydrate forming substance and the water in said fruit juice, reducing the temperature of the mixture of said hydrate and now concentrated fruit juice to the fusion temperature of water in said concentrated fruit juice, decomposing said hydrate while simultaneously forming ice crystals in said concentrated fruit juice, separating said ice crystals from said concentrated fruit juice, recovering said concentrated fruit juice as product, and using said ice crystals to absorb a portion of the latent heat of hydrate formation.

References Cited by the Examiner

UNITED STATES PATENTS

| | | | |
|---|---|---|---|
| 2,821,304 | 1/1958 | Zarchin | 62—58 |
| 2,904,511 | 9/1959 | Donath | 210—59 |
| 2,974,102 | 3/1961 | Williams | 210—59 |
| 2,997,856 | 8/1961 | Pike | 62—58 |
| 3,027,320 | 3/1962 | Buchanan | 62—58 |

FOREIGN PATENTS

| | | |
|---|---|---|
| 668,812 | 12/1938 | Germany. |
| 841,374 | 7/1960 | Great Britain. |
| 863,348 | 3/1961 | Great Britain. |
| 70,507 | 6/1946 | Norway. |

OTHER REFERENCES

Gilliland: "Fresh Water for the Future," Industrial and Engineering Chemistry, volume 47, Number 12, December 1955, pages 2410–2422.

NORMAN YUDKOFF, *Primary Examiner.*

ROBERT A. O'LEARY, *Examiner.*